United States Patent [19]

Kendall

[11] Patent Number: 4,854,071
[45] Date of Patent: Aug. 8, 1989

[54] PLASTIC FISHING SPOON TYPE LURE

[76] Inventor: Jay Kendall, 163 Collingwood Cove, Sherwood Park, Alberta, Canada, T8G 1B2

[21] Appl. No.: 131,772

[22] Filed: Dec. 8, 1987

Related U.S. Application Data

[63] Continuation-in-part of Ser. No. 871,476, Jun. 6, 1986, abandoned.

[51] Int. Cl.$^4$ .............................................. A01K 85/00
[52] U.S. Cl. ................................... 43/42.33; 43/42.5; 43/42.32
[58] Field of Search ................. 43/42.32, 42.33, 42.34, 43/42.5

[56] References Cited

U.S. PATENT DOCUMENTS

| | | | |
|---|---|---|---|
| 2,213,701 | 9/1940 | Haselwood | 43/42.33 |
| 2,510,566 | 6/1950 | Flaherty | 43/42.33 |
| 2,740,225 | 4/1956 | Dedrick | 43/42.34 |
| 3,855,721 | 12/1974 | Strader | 43/42.32 |
| 3,879,883 | 4/1975 | Strader | 43/42.32 |
| 3,935,659 | 2/1976 | McCallum | 43/42.32 |
| 4,463,018 | 7/1984 | Carr | 43/42.06 |

FOREIGN PATENT DOCUMENTS 281100 12/1927 United Kingdom .............. 43/42.33

Primary Examiner—Kurt Rowan
Attorney, Agent, or Firm—Jim Zegeer

[57] ABSTRACT

There is disclosed a fishing spoon which imitates the effect of light rays passing through a fish. The fishing spoon is comprised of a hydrodynamic body of translucent plastic having color zones whereby light passing through assumes the color of the body, the body having an aperture at one end to attach a hook and an aperture at the opposed end to attach a fishing line.

2 Claims, 2 Drawing Sheets

PLASTIC FISHING SPOON TYPE LURE

REFERENCE TO RELATED APPLICATIONS

This application is a continuation-in-part of U.S. application Ser. No. 871,476, filed June 6, 1986 entitled Plastic Fishing Spoon Type Lure, now abandoned.

The present invention relates to a fishing spoon.

BACKGROUND OF THE INVENTION

Fishing lures are classified as spinners, plugs, spoons or attractants depending upon placement in relation to the hook and the motion that they make when drawn through the water. A spoon is placed directly above the hook and in most cases is intended to wobble from side to side when drawn through the water. As the spoon is drawn through the water it may occasionally turn over temporarily exposing its underside and then rights itself.

It is known to make spoons of a reflective metal such as silver, brass, or copper. These lures are intended to catch the fish's attention as light would reflect off the spoon as it does off the silvery scales of some varieties of fish. More recently, spoons have been manufactured which are painted on one side, and on the other have a reflective metal surface. These types of spoons attempt to combine the reflective qualities which characterize the known style of lure with the realities that fish and the food they feed on in their natural environment are multi-colored. Some types of spoons have an added transparent coating of plasticised material in order to preserve the spoon from rust or corrosion.

Studies have been conducted by a number of zoologists, the most notable of which is Dr. Loren Hill, the chairman of the Department of Zoology at the University of Oklahoma into the "color vision" of fish. Dr. Hill concluded that fish rely upon color vision for food selection, as well as for other aspects of their existence, such as mating behaviour. His research has concluded that fish can distinguish between colors in the electromagnetic spectrum and, in fact, readily distinguish between closely related colors or shades of the same color. The fish's eye is apparently more sensitive to light than a human eye, thus allowing the fish to distinguish under varying water clarity and lighting conditions, colors the human eye cannot. Dr. Hill has developed under the trade name "Color-C-Lector" an under water probe and complementary color charts to assist fishermen on the selection of the correct color of spoon depending upon the season, feeding habits of particular varieties of fish, water depth where the fish are normally found and water temperature. Much is yet to be discovered regarding color and its effect on the effectiveness of spoon, however, it is apparent that the color of the spoon used is an important determinant in the success of a fisherman.

It is logical that a spoon will be more effective if the light striking it causes it to more closely resemble the qualities of the natural prey of the species of fish being sought. It is by comparing the colored spoons with fish larva which serve as the natural prey of the fish that the short comings of the spoon becomes apparent. All fish larva start out as translucent and gradually acquire their coloration. As they mature, portions of the fish larva become opaque such as the bones and internal organs. Once they have grown beyond the larva stage, most species of fish are still translucent to a greater or lesser degree. Existing spoons imitate the coloration and reflective qualities of the scales, but they do not try to imitate the effect of light rays passing through a multi-colored fish. Light rays passing through a partially translucent colored object give the water a colored aura in the vicinity of the object.

SUMMARY OF THE INVENTION

The primary object of the present invention is to provide a fishing spoon that imitates the effect of light rays passing through a fish.

Broadly, the present invention provides a fishing lure for trolling, casting or jigging comprising an ovate body of translucent material, the body having at least one zone of colored, translucent material, the color being selected from a range of colors known to attract a certain species of fish, the body further having means at one end to attach a fish hook and means at the opposite end to attach a line.

BRIEF DESCRIPTION OF THE DRAWINGS

These and other features of the invention will become more apparent from the following description in which reference is made to the appended drawings, wherein.

DETAILED DESCRIPTION OF THE INVENTION

Figure 1:
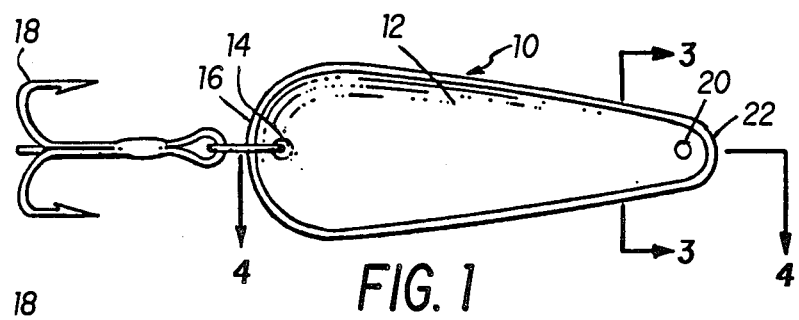
FIG. 1 is an underside plan view of a preferred embodiment of the invention.
Figure 2:
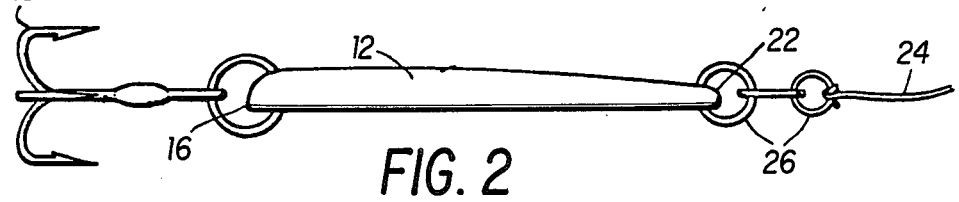
FIG. 2 is a side elevation view of a preferred embodiment of the invention.
Figure 3:
FIG. 3 is a cross-sectional view of a preferred embodiment of the invention taken along section line 3—3 of FIG. 1.
Figure 4:
FIG. 4 is a cross-sectional view of a preferred embodiment of the invention taken along section line 4—4 of FIG. 1.

The preferred embodiment of the invention, a spoon generally designated by reference numeral 10, is hereinafter described with reference to FIGS. 1 through 9. The shape selected for the purpose of illustrating spoon 10 is one of the more popular selling spoon designs, but it is to be understood that the shape of the spoon is not critical to this invention. Spoon 10 can be manufactured in any of the popular spoon designs, or any other design suitable for the intended purpose. The key aspect of the invention is the manner in which light rays are affected when they pass through the lure. In the description which follows, descriptions of fish colorations have been taken from the Fishes of Alberta, by Martin J. Paetz and Joseph S. Nelson, The Queen's Printer, Edmonton, Alberta, Canada, 1970.

Fishing spoon 10 has a body 12 which may be any one of a number of shapes and/or sizes which are common in the art. For the purposes of illustration, body 12 has an ovate form in FIG. 1. Body 12 is made from a translucent plastic material. The specific material used is not critical but must be capable of withstanding prolonged exposure to water, be unbreakable and scratch resistant in normal use and be suitable for use in normal forming technologies such as injection molding, vacuum forming, casting into a mold in a liquid state, etc. The material must also be capable of accepting color. Body 12 has an aperture 14 at one end 16 to permit attachment of a hook 18 and an aperture 20 at the opposed end 22 to permit attachment of a fishing line 24. In order to prevent spoon 10 from spinning in the water, it is coupled to the end of fishing line 24 by one or more rings 26.

Figure 5:
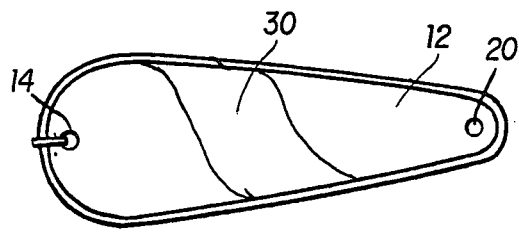
FIGS. 5 to 9 are plan views of alternate embodiments of the invention.

As indicated hereinbefore, the body 12 is made from a translucent material. Although a colorless spoon may have some application in a preferred embodiment, the spoon is provided with color either over the entire body or in a selected specific zone 30 as illustrated in FIG. 5. As described previously, certain species of fish are believed to be attracted to specific colors. Hence, the color of zone 30 is selected to correspond to the preference of the fish to be caught. Obviously, the shape of the spoon can also be chosen in accordance with known preferences of the species of fish.

Few fish are just one color, and most varieties of fish undergo changes in coloration as they mature. By way of illustration, reference may be made to the brook trout. A brook trout is olive-green dorsally, with the sides being of light tones. Distinct light-colored wormlike vermiculations appear on the top of the head, back and dorsal fin. The sides have red or pink spots which often have blue halos. Pectoral, pelvic and anal fins have a white leading edge lined with black. There are a few spots on the edges of the caudal fin. The young have 7 to 11 broad oval parr marks along the lateral line. Small young have a transparent dorsal fin, young over 2 inches long have a spotted dorsal fin, and young over 3 inches long have conspicuous vermiculations and spots.

Figure 6:
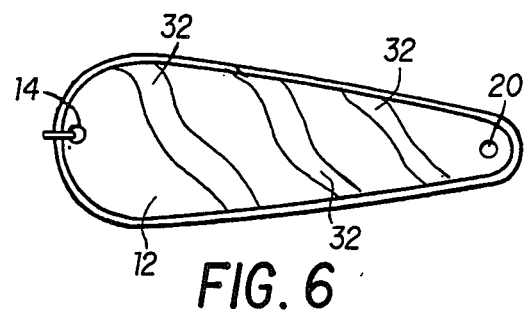

Therefore, in order to make the lure more attractive to a variety or species of fish which might feed on young brook trout, the spoon 12, as shown in FIG. 6, is formed with a plurality of zones 32 of translucent, colored material simulating the colors of the brook trout. These zones 32 may all have the same color or more preferably the variety of colors or shades noted above. Thus, light shining through the translucent body takes on the color of the colored zones and casts a multi-colored aura to the water.

Most fish on which other fish feed have some form of skeleton structure through which light does not pass. To further simulate this type of bait, therefore, body 12 may be provided with one or more opaque zones 36 shown in FIG. 7. These zones 36 are created by, for example, embedding an opaque plastic form of a preferred shape into the translucent body which may also have colored zones as previously described.

Figure 7:
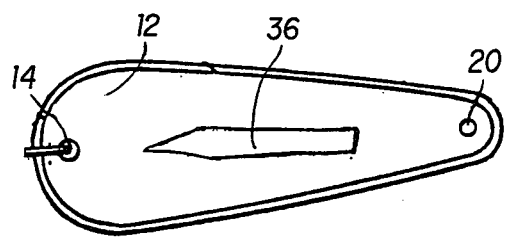

As a further modification to the embodiment shown in FIG. 7, a plurality of opaque forms may be embedded in the body either in a random distribution or in a specific configuration. An example of a body 12 having a plurality of opaque zones 38 or forms embedded therein in an ordered pattern is illustrated in FIG. 8.

Figure 8:
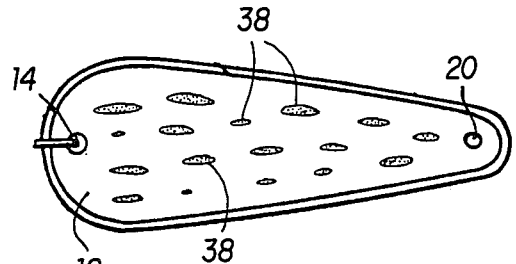

It is further comtemplated that the opaque zones or forms shown in FIG. 7 or 8 be provided with a particular odorant, which is a simulation of the odor given off by bait to which the species of fish to be caught are attracted.

Although not much is known whether fish have a developed sense of smell, it is known that they have nostrils and are attracted to certain types of bait which have a specific odor.

Figure 9:
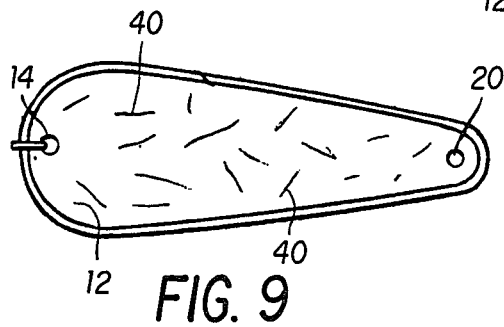

In a further embodiment, it is contemplated to form within the translucent body 12 a random distribution of flakes 40 of reflective material as shown in FIG. 9. The flakes 40 may be used in combination with a colored body or with a body having one or more colored zones. The reflective flakes 40 simulate scales which are common on certain types of fish on which other fish feed.

It is further contemplated that the flakes 40 may in addition to being reflective or instead of being reflective have a luminescent quality. This feature exaggerates the color aspect of the lure.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A fishing lure for trolling, casting or jigging comprising an ovate body of translucent material, said body having at least one zone of colored, translucent material, said colored translucent material being selected to substantially match the coloration of selected fish larva so that light rays passing through said body of translucent material and said at least one zone of colored translucent material create the coloration effect of said selected fish larva, at least one opaque zone embedded within said body of translucent material to simulate the skeletal structure of an older fish larva, said body further having means at one end to attach a fish hook and means at the opposite end to attach a line.

2. A fishing lure according to claim 1, wherein there are a plurality of said opaque zones.

* * * * *